US011751183B2

(12) United States Patent
Hakola et al.

(10) Patent No.: US 11,751,183 B2
(45) Date of Patent: Sep. 5, 2023

(54) CORESET AND QCL ASSOCIATION IN BEAM RECOVERY PROCEDURE

(71) Applicant: Nokia Technologies Oy, Espoo (FI)

(72) Inventors: Sami-Jukka Hakola, Kempele (FI); Timo Koskela, Oulu (FI); Jorma Johannes Kaikkonen, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 16/959,585

(22) PCT Filed: Jan. 11, 2019

(86) PCT No.: PCT/EP2019/050683
§ 371 (c)(1),
(2) Date: Jul. 1, 2020

(87) PCT Pub. No.: WO2019/138070
PCT Pub. Date: Jul. 18, 2019

(65) Prior Publication Data
US 2020/0389884 A1   Dec. 10, 2020

Related U.S. Application Data

(60) Provisional application No. 62/616,737, filed on Jan. 12, 2018.

(51) Int. Cl.
*H04W 72/044* (2023.01)
*H04W 36/00* (2009.01)
(Continued)

(52) U.S. Cl.
CPC ..... *H04W 72/046* (2013.01); *H04W 36/0085* (2018.08); *H04W 36/06* (2013.01);
(Continued)

(58) Field of Classification Search
CPC ........... H04W 72/046; H04W 36/0085; H04W 36/06; H04W 36/305; H04W 36/36;
(Continued)

(56) References Cited

U.S. PATENT DOCUMENTS

2018/0219606 A1* 8/2018 Ng .................. H04L 5/0053
2018/0302889 A1* 10/2018 Guo ................ H04B 7/088
(Continued)

OTHER PUBLICATIONS

3GPP TSG RAN WG1 Meeting 90bis, Prague, CZ, Oct. 9-13, 2017, RI-1717605, "On Beam Management, Measurement and Reporting", Samsung, 16 pgs.
(Continued)

*Primary Examiner* — Michael K Phillips
(74) *Attorney, Agent, or Firm* — Harrington & Smith (57) ABSTRACT

Method, apparatus, and computer program product for a CORESET beam recovery procedure and a QCL association beam recovery procedure where a condition or rule based UE initiated change of active TCI state is used. The CORESET beam recovery procedure involves a downlink reference signal corresponding to a transmission configuration indication state activated for certain CORESET being determined as a beam failure detection resource. The QCL association beam recovery procedure concerns a UE transmitting a UL request signal to require switching an active TCI state of the CORESET to a currently deactivated TCI state of the same CORESET.

20 Claims, 5 Drawing Sheets

(51) Int. Cl.
*H04W 36/30* (2009.01)
*H04W 36/06* (2009.01)
*H04W 36/36* (2009.01)
*H04W 72/23* (2023.01)
*H04W 72/542* (2023.01)

(52) U.S. Cl.
CPC ......... *H04W 36/305* (2018.08); *H04W 36/36* (2013.01); *H04W 72/23* (2023.01); *H04W 72/542* (2023.01)

(58) Field of Classification Search
CPC .. H04W 72/042; H04W 72/085; H04B 7/088; H04B 7/0695
See application file for complete search history.

(56) References Cited

U.S. PATENT DOCUMENTS

| | | | | |
|---|---|---|---|---|
| 2019/0074879 | A1* | 3/2019 | Furuskog | H04W 72/046 |
| 2019/0190582 | A1* | 6/2019 | Guo | H04L 27/2607 |
| 2019/0215048 | A1* | 7/2019 | Cirik | H04W 72/23 |
| 2019/0215888 | A1* | 7/2019 | Cirik | H04W 72/0446 |
| 2020/0099437 | A1* | 3/2020 | Harada | H04L 5/0053 |
| 2020/0274606 | A1* | 8/2020 | Kang | H04W 74/0833 |
| 2020/0280483 | A1* | 9/2020 | Zhang | H04L 41/0672 |
| 2020/0288479 | A1* | 9/2020 | Xi | H04W 72/042 |
| 2020/0374960 | A1* | 11/2020 | Deenoo | H04W 72/1284 |
| 2020/0389847 | A1* | 12/2020 | Deng | H04W 52/0219 |
| 2022/0149913 | A1* | 5/2022 | Song | H04B 7/0626 |

OTHER PUBLICATIONS

3GPP TSG-RAN WG1 #90bis, Prague, P.R. Czechia, Oct. 9-13, 2017, R1-1718541, "Beam management for NR", Qualcomm, 18 pgs.

3GPP TSG RAN WG1 Meeting #89, Hangzhou, China, May 15-17, 2017, Agenda item 7.1.2.2.2, R1-1709606, "Summary from offline for beam recovery mechanism" MediaTek, 8 pgs.

3GPP TSG RAN WG2#AH-1801, Vancouver, Canada, Jan. 22-26, 2018, R2-1800003, 3GPP TSG RAN WG21 Meeting #91, Reno, USA, Nov. 27-Dec. 1, 2017, R1-1721346, "LS to RAN2 on Beam Failure Recovery" , 4 pgs.

"Offline discussion summary on remaining issues on Beam Failure Recovery", Media Tek Inc., 3GPP TSG RAN WG1 Meeting #91, R1-1721699, Dec. 2017, 22 pages.

* cited by examiner

| TCI INDEX | SOURCE RS SET | SOURCE RS INDEX | QCL TYPE |
|---|---|---|---|
| 0 | RS SET #A | SS/PBCH BLOCK #n (OF SET #A) | A+D |
| 1 | RS SET #B | TRS #b (OF SET (#B) | A |
|  |  | CSI-RS#c(OF SET #B) | D |
| ... | ... | ... | ... |
| M-1 | RS SET #E | CSI-RS#b(OF THE SET #E) | A+D |

FIG.1
PRIOR ART

EXAMPLE: UE CONFIGURED WITH 2 CORESETs

| CORESET #0 | |
|---|---|
| CONFIGURED TCI STATE | ACTIVE<br>MAC-CE TO ACTIVATE/DEACTIVATE IN CASE OF MORE THAN ONE TCI STATE CONFIGURED PER CORESET |
| 0 | YES |
| 1 | NO |
| 5 | NO |

| CORESET #1 | |
|---|---|
| CONFIGURED TCI STATE | ACTIVE |
| M−1 | YES |

402 a TCI table to indicate source RSs for different QCL parameters; one or multiple CORESETs for NR-PDCCH reception; multiple TCI states (multiple transmit beams) associated with a CORESET; a TCI state that is active for the CORESET; and the BFRQ resource associated with one or multiple TCI states associated with a CORESET.

404

UE determines a beam failure and detects a replacement candidate beam

406

In response to the replacement candidate beam being associated with a TCI state associated with a CORESET, the UE triggers a BFRQ resource transmission associated with the replacement candidate beam

408

The UE monitors the CORESET of the DL RS associated with the replacement candidate beam via TCI linkage for PDCCH to receive a response to BFRQ

502
The UE is configured with: a TCI table to indicate source RSs for different QCL parameters; one or multiple CORESETs for NR-PDCCH reception; multiple TCI states (multiple transmit beams) associated with a CORESET; a TCI state that is active for the CORESET; and the BFRQ resource associated with one or multiple TCI states associated with a CORESET

504
UE is configured with the CORESET having a fast PDCCH beam switch request procedure enabled

506
the UE determines a deactivated TCI state and linked transmit beam to be a replacement candidate beam where the replacement candidate beam would be better than a current active PDCCH beam

508
The UE transmits a BFRQ resource associated with the deactivated TCI state

510
The UE monitors the CORESET, which the DL RS of the replacement candidate beam is associated with, via the TCI linkage for the replacement candidate PDCCH beam, to receive a response to the transmitted BFRQ resource

512
The UE receives PDCCH from the gNB from the CORESET within a time window in item 512. Finally, as shown in item 514, the UE determines that the gNB has confirmed a new active TCI state for the CORESET to use the replacement candidate PDCCH beam

FIG. 5

CORESET AND QCL ASSOCIATION IN BEAM RECOVERY PROCEDURE

CROSS REFERENCE TO RELATED APPLICATION

This patent application is a U.S. National Stage application of International Patent Application Number PCT/EP2019/050683 filed Jan. 11, 2019, which is hereby incorporated by reference in its entirety, and claims priority to U.S. provisional application 62/616,737 filed Jan. 12, 2018, which is hereby incorporated by reference in its entirety.

TECHNICAL FIELD

This invention relates generally to beam management and recovery procedures and, in particular, 3GPP New Radio (NR) physical layer design, focusing on beam recovery procedures and how control resource set (CORESET) and Quasi-colocation (QCL) associations are determined by gNB and UE.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

A UE can be configured with up to 3 CORESETs and together 10 search space sets within a configured bandwidth part (BWP). CORESET defines physical time and frequency resources on which NR-PDCCH (Physical Downlink Control Channel) can be transmitted. Search space set defines PDCCH monitoring related time domain parameters such as monitoring periodicity: In other words, search space parameters provide a UE with information when trying to detect NR-PDCCH from a certain CORESET.

A QCL framework is used for defining a "transmit beam" for different downlink physical signals and channels such as those for periodic, semi-persistent, and aperiodic CSI-RS, NR-PDCCH, and NR-PDSCH (Physical Downlink Shared Channel). As such, a UE is configured with a transmission configuration indication (TCI) table in which each row/state is associated with one or two reference signals (RSs) that act as a source RS(s) in terms of different QCL parameters (e.g., delay spread, average delay, doppler spread, doppler shift, spatial RX) for the certain downlink signal. When a spatial RX QCL parameter is to be configured for the certain source RS, the UE can assume the same RX beam (or RX spatial filter) can be applied when receiving a target physical signal or physical channel as was used for receiving the source RS. Source RS may be e.g. SS/PBCH Block (Synchronization signal/Physical Broadcast Channel), CSI-RS, TRS (tracking reference signal), DMRS (demodulation reference signal) or the like. SS/PBCH block consists of PSS, SSS (Primary, Secondary SS) and symbols carrying PBCH, including PBCH DMRS and has total length of 4 symbols. Invention is not limited to the potential alternative transmission methods of SS/PBCH block in time or frequency domain (in other words, for instance, instead of sending 4 symbols, if the SS block components may be transmitted in frequency domain, for example, using only one symbol, that would satisfy this aspect).

For determining the transmit beam for the NR-PDCCH, it has previously been agreed that each CORESET may be associated to one or multiple above mentioned TCI rows (or TCI states). In cases where the CORESET is associated with more than one TCI states, MAC-CE level activation signaling is used to control that which one of the multiple TCI states is active at a time per CORESET. UE may be configured with multiple CORESETs Search space set related parameters associated to the CORESET define time domain monitoring pattern from which the UE knows when to monitor certain CORESET; then, from associated (active) TCI state of the CORESET, the UE knows how to set its RX beam.

Figure 1:
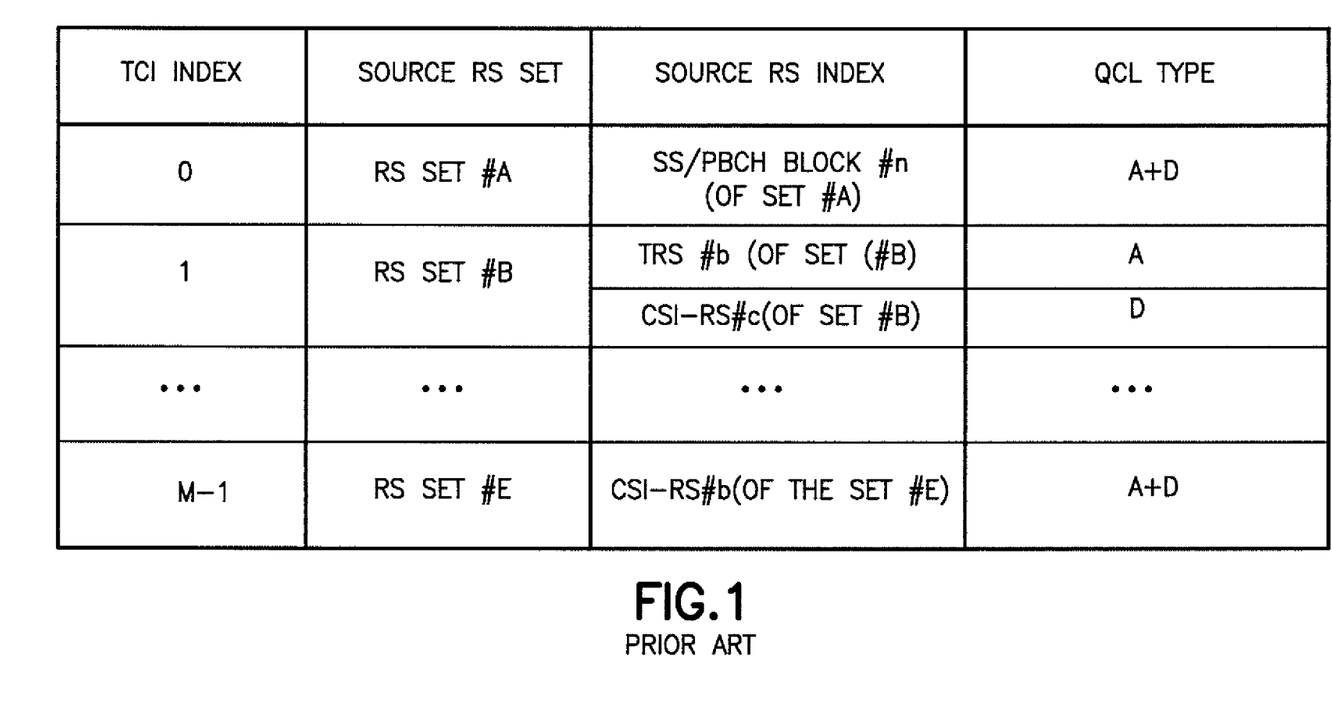
FIG. 1 is TCI table configured for the UE.

FIG. 1 provides an exemplary TCI table configured for the UE where QCL type A means Doppler spread, Doppler shift, delay spread, average delay and QCL type D means spatial RX. Thus, when TCI index 0 determines source RS(s) for a certain physical signal or channel, the UE can determine that it can set its RX beam as it was set for receiving the SS/PBCH block #n. Correspondingly, when TCI index 1 determines source RS(s) for a certain physical signal or channel, the UE can determine that it can set its RX beam as it was set for receiving the CSI-RS # (of RS set #B).

Figure 2:
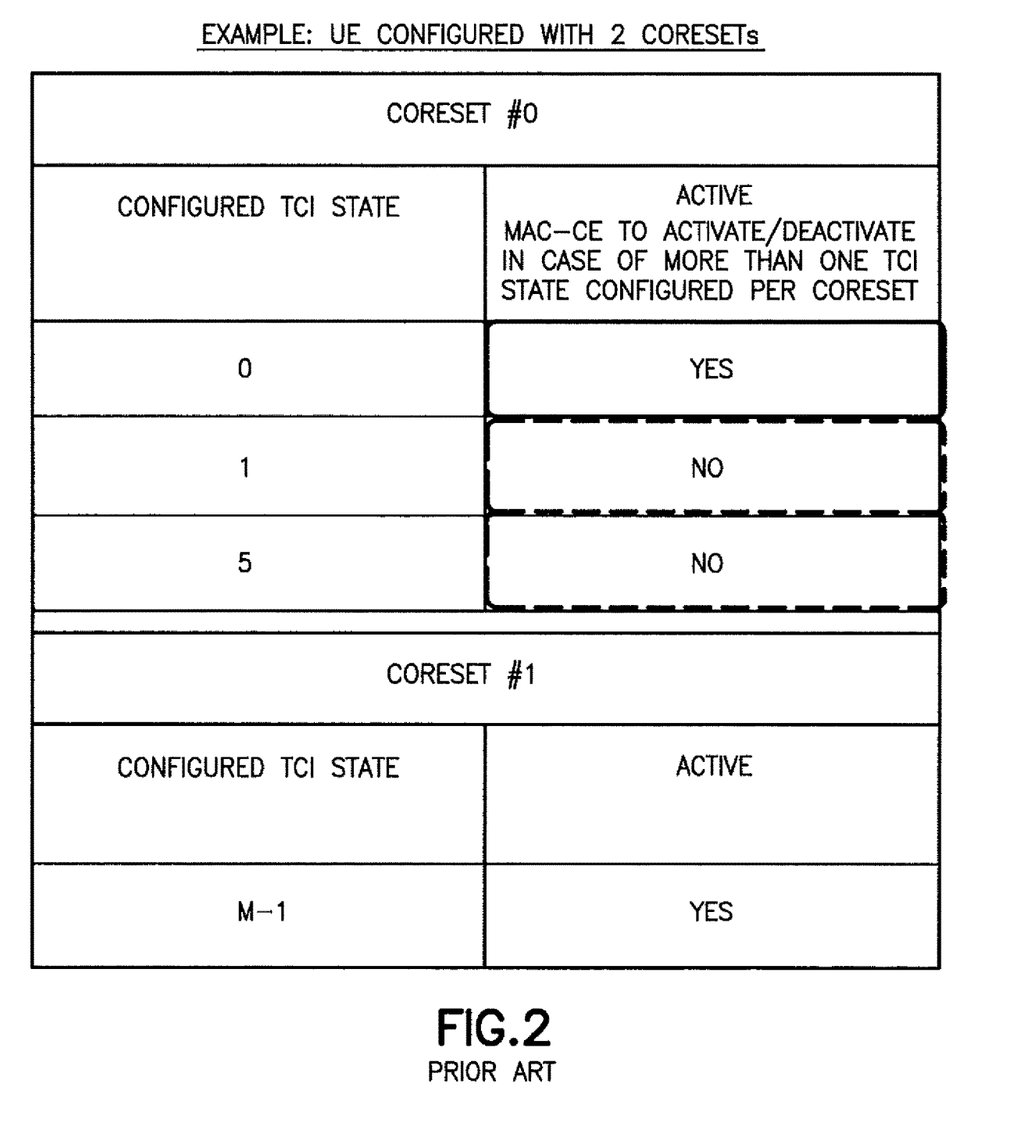
FIG. 2 is a schematic of a UE configured with two CORESETs with one or multiple TCI state associations.

FIG. 2 illustrates the case that UE has been configured two CORESETs with one or multiple TCI state associations. For the CORESET #0, MAC-CE signaling is used to activate one TCI state at a time.

It has been further previously agreed that for beam recovery procedure the UE can be configured with a dedicated CORESET for monitoring gNB response for the beam failure recovery request (BFRQ, sometimes abbreviated as BFRR). This is referred as CORESET-BFR (Beam Failure Recovery) herein after. Based on the agreement in RAN1#90bis, the UE assumes that the CORESET-BFR is spatially QCL'd with DL RS of the UE identified (and indicated) candidate beam by the beam failure recovery request. In other words, the UE indicates candidate beam (or candidate downlink RS) using an uplink preamble signal that is associated with it.

In RAN1#91 it was agreed that only periodic CSI-RS or SSB which is spatially QCL'd with PDCCH DMRS is used for beam failure detection. The monitored BFD (beam failure detection) resources (among the possible periodic RS configured to be QCL'd with PDCCH) can be specifically configured for RS for beam failure detection. If not configured, then by default the UE assumes for beam failure detection that at least one of SSB or periodic CSI-RS is QCL'd with the PDCCH DMRS.

For recovery purposes, when a UE has declared beam failure, the network can configure the UE with contention free resources from the PRACH resource pool. Contention free resources can be associated with SSBs or CSI-RS. The RS in the list are referred as candidate beams and indicated by a Candidate-beam-RS-list. To indicate a candidate, if both CSI-RS and SSB are listed but only SSBs are associated with dedicated recovery preamble resources, then the recovery to CSI-RS candidate is done via QCL association to the SSB.

To declare beam failure, the quality of downlink RS used for beam failure detection has to be below a specific quality threshold for N (or N-consecutive) beam failure monitoring instances (done periodically). Currently failure is agreed to be done based on hypothetical PDCCH BLER, determined from beam failure RS. In the case where multiple RS are used (e.g., if UE has multiple PDCCH links or NW has configured multiple beam failure RS), then the quality of all RS need to be below the quality threshold for number of beam failure instances to declare failure. Alternative, N-consecutive failure instances may be needed to declare failure.

Limitations of these previously agreed to proposals include the fact that currently DL RSs associated to active TCI states configured for the CORESET are evaluated for beam failure detection and when UE declares beam failure (all the active TCI states are considered to be in failure condition so that beam failure can be declared) and transmits BFRQ it is monitoring the CORESET-BFR for gNB response. In discussions regarding NR, which seems suboptimal in certain cases. The current limitation of state of the art is that when UE indicates recovery (regardless of which DL RS is indicated as new candidate by a dedicated recovery signal) it is required to monitor CORESET-BFR. Thus, the current invention moves beyond the current techniques and/or materials.

Abbreviations that may be found in the specification and/or the drawing figures are either defined in the text or defined below in the following list of abbreviations:

2G Second Generation
3G Third Generation
3GPP Third Generation Partnership Project
5G-NB Fifth Generation Node B
BFR Beam Failure Recovery
BFRQ Beam Failure Recovery Request
BLER Block Error Ratio
BS Base Station
BSI Beam State Information
BRI Beam Refinement Information
BRS Beam Reference Signal
BRRS Beam Refinement Reference Signal
CCE Control Channel Element
CORESET Control Resource Set
C-RNTI Cell Radio Network Temporary Identifier
DL Downlink
DMRS Demodulation Reference Signal
eNB or eNodeB Evolved Node B (LTE base station)
gNB NR/5G Node B
NB NodeB, base station
MAC-CE Medium Access Control-Control Element
NR New Radio
PDCCH Physical Downlink Control Channel
PUCCH Physical Uplink Control Channel
PUSCH Physical Uplink Shared Channel
QCL Quasi Co-location
RA Random Access
ReTx Retransmission or retransmitting
RRH Remote radio head
RS Reference Signal
RSRP Reference Signal Received Power
RSRQ Reference Signal Received Quality
Rx, RX Reception or receiving
SINR Signal to Interference and Noise Ratio
SR Scheduling Request
TCI Transmission Configuration Indication
TS Technical Specification or Technical Standard
Tx, TX Transmission or transmitting
TXRU Transceiver Unit
UE User Equipment or mobile station
UL Uplink

BRIEF DESCRIPTION OF THE DRAWINGS

In the attached Drawing Figures.

DETAILED DESCRIPTION OF THE DRAWINGS

The current Application discloses beam recovery procedures including control resource set (CORESET) and quasi co-location (QCL) association.

Please note that examples and embodiments discussed herein are not intended to be limiting. Moreover, the word "exemplary" as used herein means "serving as an example, instance, or illustration." Thus, any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As discussed above, a problem that arises based on current agreements is that all (periodic) DL RSs associated to active TCI states configured for the CORESET are evaluated for beam failure detection. In addition, currently a UE monitors only dedicated CORESET-BFR for beam failure when it has indicated new candidate to gNB via dedicated preamble.

For instance, TS38.213 appears to consider an embodiment when Beam-Failure-Detection-RS-ResourceConfig is not configured by higher layer, and higher layer parameter TCI-StatesPDCCH defines TCI state for RS resource sets for beam recovery. The TS 38.213 says "A UE is configured with one control resource set by higher layer parameter Beam-failure-Recovery-Response-CORESET. A UE can be configured, for a serving cell, with a set of periodic CSI-RS resource configuration indexes by higher layer parameter Beam-Failure-Detection-RS-ResourceConfig and with a set of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines to include SS/PBCH blocks and periodic CSI-RS configurations with same values for higher layer parameter TCI-StatesPDCCH as for control resource sets that the UE is configured for monitoring PDCCH as described in Sub-clause 10.1"

However, it seems that when a UE is not configured separately for the failure detection RS, there is implicit configuration of PDCCH beam(s) (TCI state/states that are active) as beam failure detection RS. In this case, with the method in the invention, when a UE performs beam recovery for an inactive TCI state, it would not need to monitor (and gNB does not need to transmit) the CORESET-BFR Prior to this invention, when transmitting recovery using dedicated signals, a UE monitors CORESET-BFR for gNB response. For recovery using dedicated resources, the UE monitors for DL transmission with its C-RNTI, when detected the failure recovery can be considered to be successful. The current invention proposes that when a UE transmits recovery request indicating a candidate beam that is configured as TCI state but is not active (the UE does not monitor PDCCH on inactive TCI states), it will monitor the CORESET corresponding to that TCI state instead of CORESET-BFR. The method of this invention can also be extended to cover beam recovery using dedicated random access signals (contention free random access). Although for beam recovery the dedicated signals may be configured from PRACH signal space, the procedure may differ (whether it is a beam recovery procedure or random access procedure. In random access gNB responds UE with a message using RA-RNTI and using CORESET configured for monitoring RAR (random access response). Also in this case when UE performs recovery to a TCI state associated with current CORESET for PDCCH reception, UE would not be monitoring RAR response but instead monitoring gNB response (with its C-RNTI) on the CORESET associated with indicated TCI state. In one alternative network may transmit RAR as a response to dedicated RA preamble using C-RNTI.

As an additional aspect of the invention, since the indicated TCI state may be associated to multiple CORESETs, UE needs to potentially monitor all the associated CORESETs for gNB recovery response. UE monitors gNB response for the configured time duration of ResponseWindowSize-BFR (an example of a name). Duration may be expressed as millisecond, symbols or slot (set of symbols), subframes etc. In case the TCI indicated by UE is associated with multiple CORESETs, the following rules could be used to determine whether UE monitors all the CORESETs, subset of CORESET, or only one, as the following alternatives show:

Alt1. UE monitors all CORESET during the response window

Alt2. UE monitors CORESET with smaller ID

Alt3. UE monitors CORESET which is considered to be a default CORESET (could be indicated by network or fixed to be the lowest/highest CORESET ID Alt4. UE monitors CORESET that has associated search space set with higher maximum CCE aggregation level Alt5. In case the CORESETs are transmitted with specific time domain pattern, UE monitors the CORESET according to the pattern during the recovery response window In the situation where there are potential candidate beams (DL RS) that are above a quality threshold in the TCI state configured for the CORESET but are not currently active, it would be suboptimal to switch the recovery monitoring to another CORESET. In other words, the default CORESET configuration for monitoring beam failure recovery response is typically configured with a larger set of PRBs to allow use of a higher aggregation level (e.g., to compensate for the loss of dedicated beam), using more of the system capacity. Furthermore, alignment of an additional CORESET with other CORESETs may not be optimal which may lead to poorer CORESET resource utilization or higher PDCCH blockaging e.g. which would limit the gNB scheduling flexibility.

In one additional aspect of the invention, when selecting candidate beams for beam recovery, the UE may prioritize candidate beams that are configured as TCI states (but are not active and are above the candidate beam selection threshold) over the other candidate beams. If multiple inactive TCI states are above the candidate beam threshold and can be indicated using dedicated beam recovery resource UE may select TCI state with highest signal quality in terms of hypothetical PDCCH BLER, RSRP, RSRQ or the like. In one aspect it may be beneficial for the UE to select TCI that has the hypothetical PDCCH BLER below Qin/IS (in-sync threshold) threshold used in radio link monitoring procedure (RLM) instead of basing the selection on merely RSRP measurement as the RSRP measurement does not take into account the interference. As an example, the RSRP measurement can be done on SS block signals, CSI-RS or on a combination of SS block and CSI-RS signals. As beam failure detection may be based on the same reference signals and hypothetical PDCCH BLER threshold values (Qout/OOS (out-of-sync)) as used for radio link monitoring, it may be likely that radio link problem is detected by RRC layer causing it to start radio link recovery timer T310. This timer can be stopped by counting number of IS indications at RRC, indicated by L1 when the radio link is determined to be in IS condition (the hypothetical PDCCH BLER is below threshold). In case the T310 expires i.e. the radio link is not considered to be in IS condition it will cause RRC to declare radio link failure (RLF). Example values for IS/OOS are e.g. 2% for IS and 10% for OOS (other values are not excluded and may be configured by network. Thus, selecting TCI for recovery that is in IS condition from RLM perspective may prevent the RLF. Alternatively, the UE could select TCI with lowest measured BLER on potentially detected candidate beams. Candidate selection may therefore be done in 2 stages i.e. first based on RSRP and then select candidate in IS condition from RLM perspective or select the candidate based on lowest measured hypothetical PDCCH BLER. Naturally the alternative would be to consider only BLER. In more general view and in one further example, the UE may prefer to perform recovery to candidate beam (DL RS) with IS condition regardless whether the candidate is a configured TCI state. The UE may need to indicate then the recovery using contention based mechanism such as contention based random access. Furthermore, as a response to beam recovery failure request gNB may request UE to report N-highest quality beams (downlink RS such as SS block and/or CSI-RS). Report may consist of beam/downlink RS identifier and additionally the quality level such as RSRP. In one additional example the UE may be required to report beams with hypothetical PDCCH BLER below the aforementioned IS threshold (e.g. 2%). This would allow gNB to configure new TCI states or indicate an inactive TCI state to be active.

Proposed herein is a CORESET beam recovery procedure, where a downlink reference signal (DL RS) corresponding to a transmission configuration indication (TCI) state activated for certain CORESET is determined as beam failure detection resource. Also proposed is the QCL association beam recovery procedure, where a UE may transmit UL request signal to require switching an active TCI state of the CORESET to a currently deactivated TCI state of the same CORESET. In principle, a condition or rule based UE initiated change of active TCI state is proposed.

The proposed operation would be that UE monitors from all configured CORESETs the active TCI state (or states) DL RS for determining the beam failure. If all active TCIs associated with one or multiple CORESETs are in failure condition, then then UE looks also to DL RS of nonactive TCI states of these CORESETs. If non-active TCI state DL RS are alive (i.e. the signal quality in terms of RSRP, RSRQ SINR, hypothetical PDCCH BLER etc. is considered to be good), then the UE initializes beam failure recovery request (BFRQ) using the configured contention free random access resources configured for beam failure recovery corresponding to that TCI state. Then, then UE monitors for BRFQ response on CORESET associated with the indicated TCI state (indicated by BRFQ preamble), instead of on the dedicated CORESET or default CORESET for beam failure recovery.

Specifically, in a first incarnation of the present invention, it is proposed that DL RS corresponding to a TCI state activated (by means of MAC-CE) for a certain CORESET is determined as beam failure detection resource. Other DL RSs associated to TCI states configured for the CORESET may be configured to be associated to dedicated UL signal (PRACH resources for beam failure recovery) for beam failure recovery request. Then, if the UE triggers beam recovery procedure using a dedicated UL signal associated to DL RS corresponding to a TCI state configured in a deactivated state for the certain CORESET, the UE will remain monitoring response from the gNB using the CORESET associated (through the TCI) with the DL RS instead of dedicated beam recovery CORESET(-BFR). A method similar to that of this invention may also be used when performing recovery using RA procedure with CFRA resource. Both beam failure recovery and contention free random access resources may be configured from same the pool of PRACH resource but actual procedure may differ. Alternatively, or additionally the contention free signals may be configured from a preamble resource pool that can be used to transmit preamble signal when UE is in uplink-synchronized state i.e. UE has obtained Timing Advance and thus the signaling resource pool may have more preambles since the preamble signal does not have to take into account the timing uncertainty of an uplink transmission. Such signals are for example scheduling request (SR) as in LTE.

In another incarnation, a fast NR-PDCCH beam switch procedure is proposed, where the UE may transmit UL request signal to require switching an active TCI state of the CORESET to a currently deactivated TCI state of the same CORESET. In other words, the gNB may configure, similar to above, the UL BFRQ resources associated with deactivated TCI states of the certain CORESET. When the UE transmits BRFQ signal associated to the certain TCI state of the CORESET, then the UE implicitly assumes that the TCI state as active in the CORESET and the UE tries to detect PDCCH, confirming the switch from the CORESET assuming the requested new active TCI state. There may a certain window defined/configured for how long a UE can assume a response from the gNB for the beam switch request. The gNB may confirm the switch by scheduling DL/UL grant using C-RNTI or in an explicit TCI state configuration message (MAC CE/DCI). In case a TCI state is associated with multiple CORESETS, similar rules may be applied as described for beam recovery.

This whole functionality may be configurable per CORESET, whether the UE may request switching active TCI state per CORESET or not.

When UE has declared a beam failure of an active TCI state for a specific CORESET, it can indicate the switch to an inactive TCI state in the same CORESET as being considered as recovery from a special case, as a failure of subset of control links, or as a partial beam failure. There may be further rules defined for fast switching, for instance, if the quality of inactive TCI state (measured using corresponding DL RS) becomes offset better (quality of inactive TCI state becomes is higher than quality of an active TCI state+offset value) than current active TCI state (where the offset value may be positive, negative or zero). Quality in this case may refer to RSRP, RSRQ, hypothetical PDCCH BLER, SINR, etc. of the DL RS/TCI state.

For the "not" situation, the UE would follow beam recovery related procedures for the CORESET. In other words, for the CORESETs for which a "fast NR-PDCCH beam switch request" procedure is disabled, the UE follows beam recovery procedure.

Figure 3:
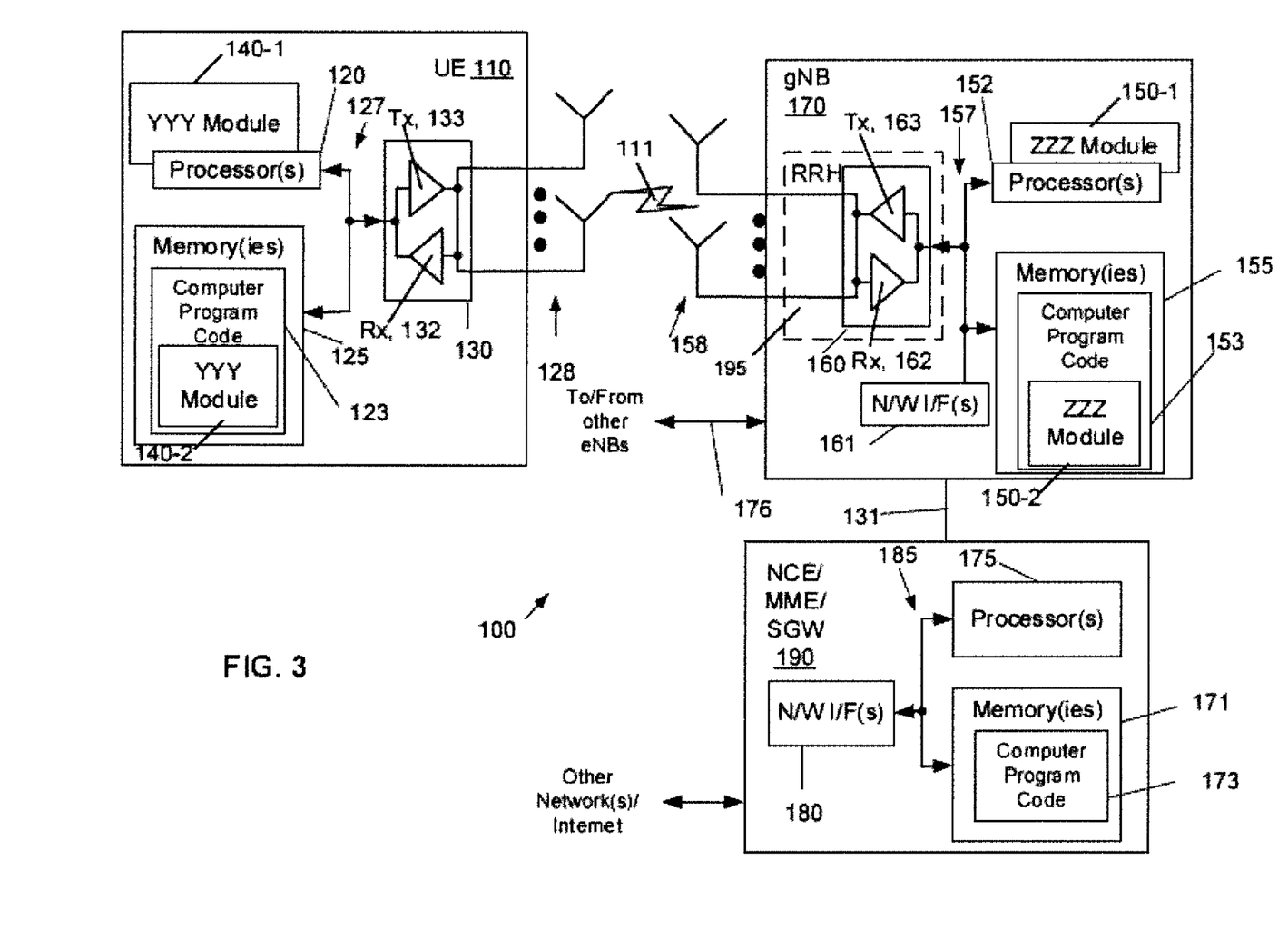
FIG. 3 is a block diagram of one possible and non-limiting exemplary system in which the exemplary embodiments may be practiced.

Before turning to a further discussion of the current invention, we turn to FIG. 3, which is a block diagram of one possible and non-limiting exemplary system in which the exemplary embodiments may be practiced.

Please note that the word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims In FIG. 3, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Note that the YYY module allows functionality for the usage of control resources for data transmission where any method or examples of such embodiments discussed herein can be practiced. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (an evolved NodeB or a New Radio 5G NodeB, which would denoted as gNB) 170 is a base station (e.g., for LTE, long term evolution, or 5G base station) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. Note that the ZZZ module allows functionality for the usage of control resources for data transmission where any method or examples of such embodiments discussed herein can be practiced. The eNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell would perform the functions. The cell makes up part of an eNB. That is, there can be multiple cells per eNB. For instance, there could be three cells for a single eNB carrier frequency and associated bandwidth, each cell covering one-third of a 360-degree area so that the single eNB's coverage area covers an approximate oval or circle. Furthermore, each cell can correspond to a single carrier and an eNB may use multiple carriers. So if there are three 120-degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular phones such as smart devices, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless Internet access and browsing, tablets with wireless communication capabilities, as well as portable units or terminals that incorporate combinations of such functions. In addition, various embodiments of the user equipment include machines, communicators and categories of equipment, which are not primarily or not at all in use by human interaction.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Figure 4:
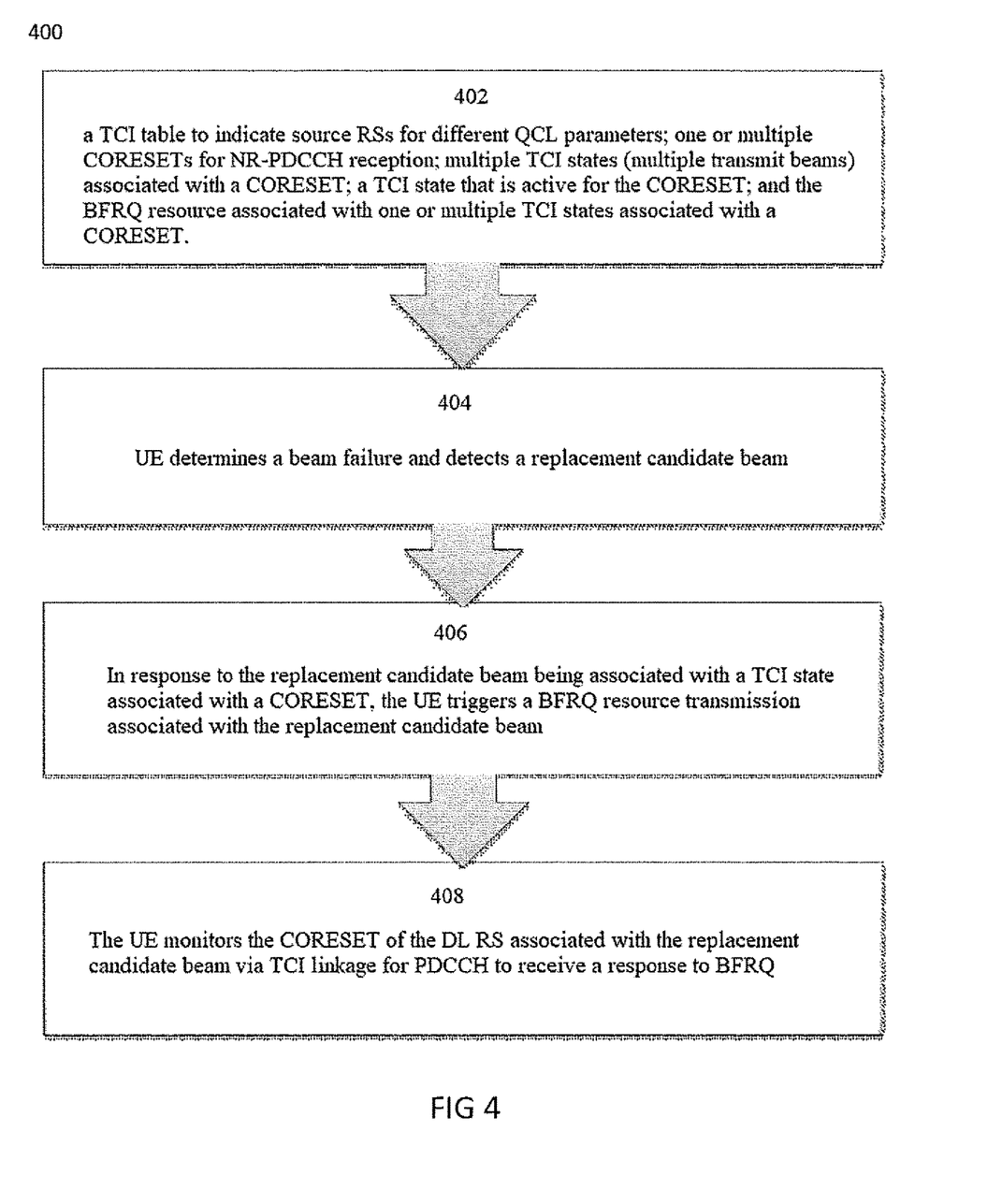
FIG. 4 is a logic flow diagram an exemplary method, a result of execution of computer program instructions embodied on a computer readable memory, functions performed by logic implemented in hardware, and/or interconnected means for performing functions in accordance with exemplary embodiments s; and,
FIG. 5 is a logic flow diagram another exemplary method, a result of execution of computer program instructions embodied on a computer readable memory, functions performed by logic implemented in hardware, and/or interconnected means for performing functions in accordance with exemplary embodiments.

FIG. 4 is a logic flow diagram for a beam recovery procedure employing CORESET and CQL association by illustrating the operation of an exemplary method 400, a result of execution of computer program instructions embodied on a computer readable memory, functions performed by logic implemented in hardware, and/or interconnected means for performing functions in accordance with exemplary embodiments. Parts or all of method 400 could be performed in module YYY or module ZZZ as appropriate.

As can be seen from FIG. 4, In item 402, the UE is configured in a number of ways. First, the UE is configured with a TCI table to indicate source RSs for different QCL parameters. The UE is configured with one or multiple CORESETs for NR-PDCCH reception. Then the UE is configured with multiple TCI states (multiple transmit beams) associated with a CORESET. And, then the UE is configured with a TCI state that is active for the CORESET. The UE is also configured with the BFRQ resource associated with one or multiple TCI states associated with a CORESET.

Given these configurations, per item 404, the UE determines a beam failure and detects a replacement candidate beam.

In response to the replacement candidate beam being associated with a TCI state associated with a CORESET, per item 406, the UE triggers a BFRQ resource transmission associated with the replacement candidate beam.

Thereafter, as seen in item 408, the UE monitors the CORESET of the DL RS associated with the replacement candidate beam via TCI linkage for PDCCH to receive a response to BFRQ.

Figure 5:
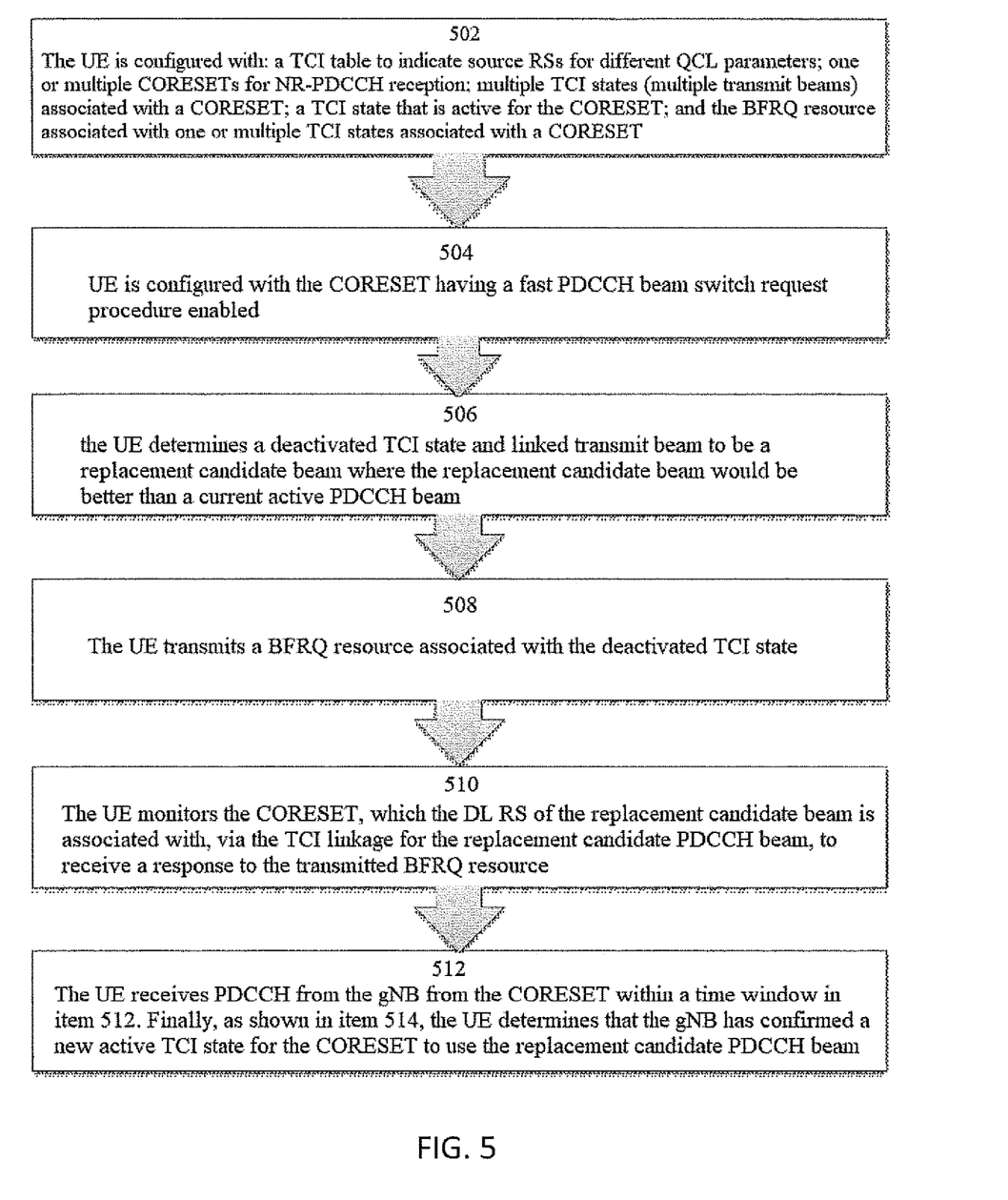

FIG. 5 is a logic flow diagram for a beam recovery procedure employing CORESET and CQL association by illustrating the operation of an exemplary method 500, a result of execution of computer program instructions embodied on a computer readable memory, functions performed by logic implemented in hardware, and/or interconnected means for performing functions in accordance with exemplary embodiments. Parts or all of method 500 could be performed in module YYY or module ZZZ as appropriate.

As with item 402 described above, the UE in this exemplary embodiment is also configured with the following as shown in item 502: a TCI table to indicate source RSs for different QCL parameters; one or multiple CORESETs for NR-PDCCH reception; multiple TCI states (multiple transmit beams) associated with a CORESET; a TCI state that is active for the CORESET; and the BFRQ resource associated with one or multiple TCI states associated with a CORESET.

In this exemplary embodiment, per item 504, UE is further configured with the CORESET having a fast PDCCH beam switch request procedure enabled.

Given these configurations, per item 506, the UE determines a deactivated TCI state and linked transmit beam to be a replacement candidate beam where the replacement candidate beam would be better than a current active PDCCH beam.

The UE transmits a BFRQ resource associated with the deactivated TCI state as shown in item 508.

Item 510 shows that the UE monitors the CORESET, which the DL RS of the replacement candidate beam is associated with, via the TCI linkage for the replacement candidate PDCCH beam, to receive a response to the transmitted BFRQ resource.

The UE receives PDCCH from the gNB from the CORESET within a time window in item 512. Finally, as shown in item 514, the UE determines that the gNB has confirmed a new active TCI state for the CORESET to use the replacement candidate PDCCH beam.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is that by enabling the recovery to be performed to RS resources that are already associated with UE specific CORESET, system PDCCH capacity can be preserved.

A further advantage or technical effect of one or more of the exemplary embodiments disclosed herein is that it allows a fast NR-PDCCH beam switch procedure to be enabled (second embodiment) without need for first requesting beam measurement results from the UE before performing transmit beam change.

An example of an embodiment, which can be referred to as item 1, is a method comprising: determining a second beam for a node in a wireless communications system to switch to from a first beam; transmitting a BFRQ resource associated with the second beam; and monitoring a CORESET of a DL RS associated with the second beam via TCI linkage for PDCCH to receive a response to the BFRQ resource transmission.

An example of a further embodiment, which can be referred to as item 2, is the method of item 1 where the node is configured with the CORESET having a fast PDCCH beam switch request procedure enabled.

An example of a further embodiment, which can be referred to as item 3, is the method of any preceding item, further comprising: receiving a PDCCH from the CORESET within a time window.

An example of a further embodiment, which can be referred to as item 4, is the method of any preceding item, further comprising: ascertaining confirmation for the switch to a new active TCI state for the CORESET.

An example of a further embodiment, which can be referred to as item 5, is the method of any preceding item where the determining comprises favoring a deactivated or inactive TCI state of the second beam over the PDCCH of the first beam.

An example of a further embodiment, which can be referred to as item 6, is the method of item 5 where the favoring comprises assessing the quality of the inactive TCI state, measured using corresponding DL RS, to be higher than quality of an active TCI state of the first beam plus an offset value, where the offset value may be positive, negative or zero, or higher than a predetermined threshold value.

An example of a further embodiment, which can be referred to as item 7, is the method of any of items 1-4 further comprising: prior to the determining, detecting a failure of the first beam.

An example of a further embodiment, which can be referred to as item 8, is the method of item 7, further comprising: after the determining, in response to the second beam being associated with a TCI states also associated with the CORESET, triggering the transmitting.

An example of a further embodiment, which can be referred to as item 9, is the method of any preceding item where the node is a user equipment.

An example of an embodiment, which can be referred to as item 10, is the method of any preceding item where the node is configured with a TCI table to indicate source RSs for different QCL parameters.

An example of a further embodiment, which can be referred to as item 11, is the method of any preceding item where the node is configured with one or more CORESETs for NR-PDCCH reception.

An example of a further embodiment, which can be referred to as item 12, is the method of any preceding item where the node is configured with multiple TCI states (multiple transmit beams) associated with each CORESET of the one or more CORESETs.

An example of a further embodiment, which can be referred to as item 13, is the method of any preceding item where the node is configured with a TCI state that is active for a CORESET.

An example of a further embodiment, which can be referred to as item 14, is the method of any preceding item where the node is configured with the BFRQ resource associated with one or multiple TCI states associated with a CORESET.

An example of another embodiment, which can be referred to as item 15, is an apparatus comprising: determining a second beam for a node in a wireless communications system to switch to from a first beam; transmitting a BFRQ resource associated with the second beam; and monitoring a CORESET of a DL RS associated with the second beam via TCI linkage for PDCCH to receive a response to the BFRQ resource transmission.

An example of another further embodiment, which can be referred to as item 16, is the apparatus of item 15 where the node is configured with the CORESET having a fast PDCCH beam switch request procedure enabled.

An example of another further embodiment, which can be referred to as item 17, is the apparatus of any of items 15-16, where the at least one memory and the computer code are further configured, with the at least one processor, to cause the apparatus to at least perform the following: receiving a PDCCH from the CORESET within a time window.

An example of another further embodiment, which can be referred to as item 18, is the apparatus of any of items 15-17, further comprising: ascertaining confirmation for the switch to a new active TCI state for the CORESET.

An example of another further embodiment, which can be referred to as item 19, is the apparatus of any of items 15-18 where the determining comprises favoring a deactivated or inactive TCI state of the second beam over the PDCCH of the first beam.

An example of another further embodiment, which can be referred to as item 20, is the apparatus of item 19 where the favoring comprises assessing the quality of the inactive TCI state, measured using corresponding DL RS, to be higher than quality of an active TCI state of the first beam plus an offset value, where the offset value may be positive, negative or zero, or higher than a predetermined threshold value.

An example of another further embodiment, which can be referred to as item 21, is the apparatus of any of items 15-18, where at least one processor and at least one memory including computer program code are further configured, with the at least one processor, to cause the apparatus to at least perform the following: prior to the determining, detecting a failure of the first beam.

An example of another further embodiment, which can be referred to as item 22, is the apparatus of item 21, where the at least one memory and the computer code are further configured, with the at least one processor, to cause the apparatus to at least perform the following: after the determining, in response to the second beam being associated with a TCI states also associated with the CORESET, triggering the transmitting.

An example of another further embodiment, which can be referred to as item 23, is the apparatus of any of items 15-22 where the node is a user equipment.

An example of another further embodiment, which can be referred to as item 24, is the apparatus of any of items 15-23 where the node is configured with a TCI table to indicate source RSs for different QCL parameters.

An example of another further embodiment, which can be referred to as item 25, is the apparatus of any of items 15-24 where the node is configured with one or more CORESETs for NR-PDCCH reception.

An example of another further embodiment, which can be referred to as item 26, is the apparatus of any of items 15-25 where the node is configured with multiple TCI states (multiple transmit beams) associated with each CORESET of the one or more CORESETs.

An example of another further embodiment, which can be referred to as item 27, is the apparatus of any of items 15-26 where the node is configured with a TCI state that is active for a CORESET.

An example of another further embodiment, which can be referred to as item 28, is the apparatus of any of items 15-27 where the node is configured with the BFRQ resource associated with one or multiple TCI states associated with a CORESET.

An example of yet another embodiment, which can be referred to as item 29, is an apparatus comprising means for determining a second beam for a node in a wireless communications system to switch to from a first beam; transmitting a BFRQ resource associated with the second beam; and monitoring a CORESET of a DL RS associated with the second beam via TCI linkage for PDCCH to receive a response to the BFRQ resource transmission.

An example of yet other embodiments, is the apparatus of item 29 additionally preforming the steps of any of the methods of any of items 2-14.

An example of a still further embodiment, which can be referred to as item 30, is a computer program code with code for performing any of the methods of claims 1-14.

An example of another still further embodiment, which can be referred to as item 31, is a computer program product where the computer program of item 30 is embodied on a non-transitory computer readable medium.

An example of yet another embodiment, which can be referred to as item 32, is a computer program product embodied on a non-transitory computer-readable medium in which a computer program is stored that, when being executed by a computer, is configured to provide instructions to control or carry out any of the methods of items 1-14.

It is also noted herein that while the above describes examples of embodiments of the invention, these descriptions should not be viewed in a limiting sense. Rather, there are several variations and modifications which may be made without departing from the scope of the present invention as defined in the appended claims.

The invention claimed is:

1. A method comprising:
   determining, by a user equipment, a second beam for the user equipment in a wireless communications system to switch from a first beam;
   transmitting a beam failure recovery request resource based on a reference signal received power measurement associated with the second beam being above a predetermined reference signal received power threshold; and
   monitoring a control resource set according to quasi co-location parameters defined by a downlink reference signal associated with the second beam for physical downlink control channel to receive a response to the beam failure recovery request resource transmission.

2. The method of claim 1, wherein the user equipment is configured with the control resource set having a fast physical downlink control channel beam switch request procedure enabled.

3. The method of claim 1, further comprising: ascertaining confirmation for the switch to a new active transmission configuration indication state for the control resource set.

4. The method of claim 1, wherein the determining comprises favoring a deactivated or inactive transmission configuration indication state of the second beam over the physical downlink control channel of the first beam.

5. The method of claim 4, wherein the favoring comprises assessing the quality of the inactive transmission configuration indication state, measured using corresponding downlink reference signal, to be higher than quality of an active transmission configuration indication state of the first beam plus an offset value, where the offset value may be positive, negative or zero, or higher than the predetermined reference signal received power threshold value.

6. The method of claim 1, further comprising: prior to the determining, detecting a failure of the first beam and further comprising: after the determining, in response to the second beam being associated with a transmission configuration indication states also associated with the control resource set, triggering the transmitting.

7. The method of claim 1, wherein the user equipment is configured with the beam failure recovery request resource associated with one or multiple transmission configuration indication states associated with the control resource set.

8. The method of claim 1, wherein a transmission configuration indication state is linked to a transmit beam.

9. The method of claim 1, wherein transmitting the beam failure recovery request resource is based on a reference signal received power measurement associated with the second beam being above the predetermined reference signal received power threshold, wherein the reference signal received power measurement is performed on at least one of a synchronization signal or a channel state information reference signal.

10. The method of claim 1, comprising:
    based on the determining, starting a radio link recovery timer, wherein the radio link recovery timer is stopped by counting a number of IS indications in a radio resource control layer.

11. An apparatus comprising:
    at least one processor and at least one non-transitory memory including computer program code, wherein the at least one memory and the computer code are configured, with the at least one processor, to cause the apparatus to at least perform the following:
    determining, by a user equipment, a second beam for the user equipment in a wireless communications system to switch from a first beam;
    transmitting a beam failure recovery request resource based on a reference signal received power measurement associated with the second beam being above a predetermined reference signal received power threshold; and
    monitoring a control resource set according to quasi co-location parameters defined by a downlink reference signal associated with the second beam for physical downlink control channel to receive a response to the beam failure recovery request resource transmission.

12. The apparatus of claim 11, wherein the user equipment is configured with the control resource set having a fast physical downlink control channel beam switch request procedure enabled.

13. The apparatus of claim 11, wherein the at least one memory and the computer code are further configured, with the at least one processor, to cause the apparatus to at least perform the following: ascertaining confirmation for the switch to a new active transmission configuration indication state for the control resource set.

14. The apparatus of claim 11, wherein the determining comprises favoring a deactivated or inactive transmission configuration indication state of the second beam over the physical downlink control channel of the first beam.

15. The apparatus of claim 14, wherein the favoring comprises assessing the quality of the inactive transmission configuration indication state, measured using corresponding downlink reference signal, to be higher than quality of an active transmission configuration indication state of the first beam plus an offset value, where the offset value may be positive, negative or zero, or higher than a predetermined threshold value.

16. The apparatus of claim 11, wherein the at least one memory and the computer code are further configured, with the at least one processor, to cause the apparatus to at least perform the following: prior to the determining, detecting a failure of the first beam and wherein the at least one memory and the computer code are further configured, with the at least one processor, to cause the apparatus to at least perform the following: after the determining, in response to the second beam being associated with a transmission configuration indication states also associated with the control resource set, triggering the transmitting.

17. The apparatus of claim 11, wherein the node is configured with one or more control resource sets for new radio physical downlink control channel reception.

18. The apparatus of claim 11, wherein the user equipment is configured with the beam failure recovery request resource associated with one or multiple transmission configuration indication states associated with a control resource set.

19. The apparatus of claim 11, wherein a transmission configuration indication state is linked to a transmit beam.

20. A computer program product embodied on a non-transitory computer-readable medium in which a computer program is stored that, when being executed by a computer, is configured to provide instructions to control or carry out the method of claim 1.

* * * * *